(12) United States Patent
Wagener et al.

(10) Patent No.: US 9,341,870 B1
(45) Date of Patent: May 17, 2016

(54) LAUNCH OPTICS WITH OPTICAL PATH COMPENSATION FOR A WAVELENGTH SELECTIVE SWITCH

(71) Applicant: Nistica, Inc., Bridgewater, NJ (US)

(72) Inventors: Jefferson L. Wagener, Morristown, NJ (US); Mitchell E. Haller, Marlboro, NJ (US)

(73) Assignee: Nistica, Inc., Bridgewater, NJ (US)

( * ) Notice: Subject to any disclaimer, the term of this patent is extended or adjusted under 35 U.S.C. 154(b) by 0 days.

(21) Appl. No.: 14/554,633

(22) Filed: Nov. 26, 2014

(51) Int. Cl.
| | |
|---|---|
| *G02B 26/08* | (2006.01) |
| *G02F 1/01* | (2006.01) |
| *G02F 1/13* | (2006.01) |
| *G02B 5/30* | (2006.01) |
| *G02B 27/28* | (2006.01) |
| *G02F 1/1335* | (2006.01) |
| *G02B 26/00* | (2006.01) |
| *G02B 27/10* | (2006.01) |

(Continued)

(52) U.S. Cl.
CPC .......... *G02F 1/1326* (2013.01); *G02B 5/3083* (2013.01); *G02B 27/283* (2013.01); *G02B 27/286* (2013.01); *G02B 1/005* (2013.01); *G02B 5/1814* (2013.01); *G02B 5/30* (2013.01); *G02B 6/2773* (2013.01); *G02B 26/00* (2013.01); *G02B 26/001* (2013.01); *G02B 26/005* (2013.01); *G02B 26/007* (2013.01); *G02B 26/06* (2013.01); *G02B 26/0816* (2013.01); *G02B 26/0833* (2013.01); *G02B 27/0068* (2013.01); *G02B 27/0172* (2013.01); *G02B 27/1026* (2013.01); *G02F 1/01* (2013.01); *G02F 1/133606* (2013.01); *G02F 2202/32* (2013.01); *G02F 2203/12* (2013.01); *G02F 2203/50* (2013.01)

(58) Field of Classification Search
CPC ............ G02B 26/005; G02B 26/0833; G02B 26/001; G02B 26/0816; G02B 27/0172; G02B 26/007; G02B 26/06; G02B 26/00; G02B 27/286; G02B 27/0068; G02B 5/1814; G02B 1/005; G02B 27/1026; G02B 5/30; G02B 6/2773; G02F 1/01; G02F 1/133606; G02F 2202/32; G02F 2203/12; G02F 2203/50
USPC ......... 359/223.1, 279, 290, 291, 298; 385/16, 385/39

See application file for complete search history.

(56) References Cited

U.S. PATENT DOCUMENTS

| | | | |
|---|---|---|---|
| 5,347,392 A | * | 9/1994 | Chen .................. H04B 10/50 359/279 |
| 6,430,328 B1 | | 8/2002 | Culver et al. |

(Continued)

*Primary Examiner* — Evelyn A Lester
(74) *Attorney, Agent, or Firm* — Stuart H. Mayer; Mayer & Williams PC

(57) ABSTRACT

An optical device includes an optical port array, a first walk-off crystal, a first half-wave plate, a second walk-off crystal and a segmented half-wave plate. The optical port array has a first and second plurality of ports for receiving optical beams. The first walk-off crystal spatially separates the beams into first and second portions that are in first and second orthogonal polarization states, respectively. The first portions are walked-off by the first walk-off crystal and the second portions pass therethrough without being walked-off. The first half-wave plate rotates the polarization state of the first and second portions of the optical beams. The second walk-off crystal is oriented in an opposite direction from the first walk-off crystal such that the second portions are walked-off by the second walk-off crystal and the first portions pass therethrough without being walked-off. The segmented half-wave plate receives the first or second portions of the beams.

18 Claims, 2 Drawing Sheets

(51) Int. Cl.
  *G02B 1/00* (2006.01)
  *G02B 27/00* (2006.01)
  *G02B 5/18* (2006.01)
  *G02B 26/06* (2006.01)
  *G02B 27/01* (2006.01)
  *G02B 6/27* (2006.01)

(56) References Cited

U.S. PATENT DOCUMENTS

| | | | |
|---|---|---|---|
| 6,721,473 B1 | 4/2004 | Islam | |
| 6,760,142 B2 * | 7/2004 | Leuthold | H04B 10/504 359/264 |
| 6,842,569 B2 * | 1/2005 | Thaniyavarn | G02F 1/3136 385/16 |
| 6,847,479 B1 | 1/2005 | Islam | |
| 6,882,771 B1 | 4/2005 | Islam | |
| 6,937,782 B2 * | 8/2005 | Robinson | G02F 1/3515 385/16 |
| 6,956,687 B2 | 10/2005 | Moon et al. | |
| 7,092,599 B2 | 8/2006 | Frisken | |
| 7,116,862 B1 | 10/2006 | Islam | |
| 7,123,833 B2 | 10/2006 | Szczepanek et al. | |
| 7,126,740 B2 | 10/2006 | Szczepanek et al. | |
| 7,339,714 B1 | 3/2008 | Islam | |
| 7,397,980 B2 | 7/2008 | Frisken | |
| 8,780,433 B2 * | 7/2014 | Yao | G02F 1/0136 359/290 |
| 2006/0067611 A1 * | 3/2006 | Frisken | G02B 6/272 385/16 |
| 2006/0176542 A1 * | 8/2006 | Muro | G01N 21/6458 359/290 |
| 2009/0257106 A1 * | 10/2009 | Tan | G02B 27/48 359/279 |
| 2010/0232000 A1 * | 9/2010 | Futterer | G02B 26/005 359/9 |

* cited by examiner

LAUNCH OPTICS WITH OPTICAL PATH COMPENSATION FOR A WAVELENGTH SELECTIVE SWITCH

BACKGROUND

Optical networks use Wavelength Selective Switches (WSS) to dynamically route optical wavelength signals from a source to a destination. WSS devices often rely on wavelength manipulation elements such as liquid crystal on silicon (LCoS) devices or micro-electromechanical (MEMS) mirror arrays to perform the routing.

LCoS devices include a liquid crystal material sandwiched between a transparent glass layer having a transparent electrode, and a silicon substrate divided into a two-dimensional array of individually addressable pixels. Each pixel is individually drivable by a voltage signal to provide a local phase change to an optical signal, thereby providing a two-dimensional array of phase manipulating regions. Manipulation of individual spectral components is possible once an optical signal has been spatially separated by a diffractive element such as a diffraction grating. The spatial separation of spectral components is directed onto predetermined regions of the LCoS device, which can be independently manipulated by driving the corresponding pixels in a predetermined manner.

SUMMARY

A method and device is provided for compensating for a difference in optical path length traversed by first and second optical portions of an optical beam which are in orthogonal polarization states. In accordance with the method, the optical beam is received at the input port and directed to a first walk-off crystal for spatially separating the optical beam into first and second optical portions that are in first and second polarization states, respectively. The first and second polarization states are orthogonal to one another. The first optical portion is walked-off by the walk-off crystal and the second optical portion passes therethrough without being walked-off. The polarization state of the first and second optical portions is rotated. After rotating the polarization state of the first and second optical portions, the first and second optical portions are directed to a second walk-off crystal that is oriented in an opposite direction from the first walk-off crystal so that the second optical component is walked-off by the walk-off crystal and the first optical component passes therethrough without being walked-off. Thicknesses of the first and second walk-off crystals are selected to adjust the optical path lengths traversed by each of the first and second optical portions.

In one particular implementation, an optical device includes an optical port array, a first walk-off crystal, a first half-wave plate, a second walk-off crystal and a segmented half-wave plate. The optical port array has a first plurality of ports for receiving optical beams and a second plurality of ports for receiving optical beams. The first walk-off crystal spatially separates each of the optical beams into first and second optical portions that are in first and second polarization states, respectively. The first and second polarization states are orthogonal to one another. The first optical portions are walked-off by the first walk-off crystal and the second optical portions pass therethrough without being walked-off. The first half-wave plate rotates the polarization state of the first and second optical portions of the optical beams. The second walk-off crystal is oriented in an opposite direction from the first walk-off crystal such that the second optical portions are walked-off by the second walk-off crystal and the first portions pass therethrough without being walked-off. The segmented half-wave plate receives the second optical portions of the optical beams or the first optical portions of the optical beams.

DETAILED DESCRIPTION

Figure 1:
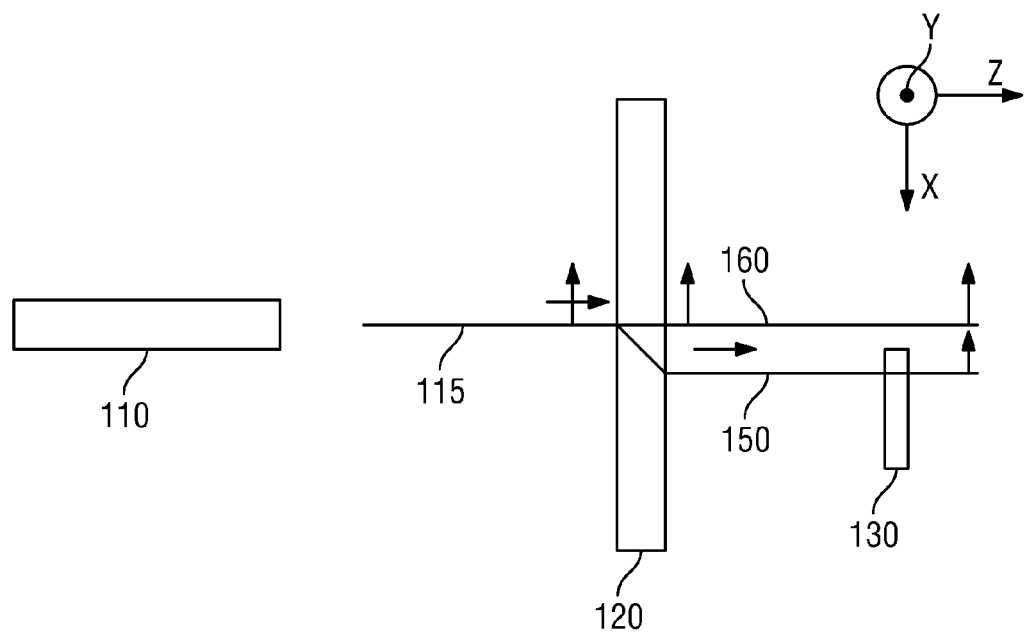
FIG. 1 shows a single input port to an optical arrangement such as a WSS that employs a LCoS device.

FIG. 1 shows a single input port 110 to an optical arrangement such as a WSS that employs a LCoS device. The input beam 115 to such a device can sometimes be highly astigmatic. In the representation shown in FIG. 1, the beam 115 has a small waist along the y-axis and a large waist along the z-axis. The beam 115, which is randomly polarized, first enters a walk-off crystal 120 to spatially separate the beam into two orthogonally polarized beams, a walked-off beam 150 and a pass-through beam 160. In FIG. 1 one polarization component (e.g., a vertical or v-component) is denoted by a vertical arrow, and the other polarization component (e.g., a horizontal or h-component) is denoted by a horizontal arrow. The walk-off direction of walk-off crystal 120 and the directions of rotation caused by the half-wave plate 130 will be described with respect to polarization components of light beams propagating in the forward or downstream direction, i.e., positive z-direction.

In order to place both the two spatially separated beams 150 and 160 exiting the walk-off crystal 120 into the same polarization state the walked-off beam 150 passes through a half-wave plate 130 that rotates the walked-off beam from the h-polarization state to the v-polarization state. The v-polarized beam 160 does not pass through the half-wave plate 130. As a result the beams 150 and 160 are both in the same polarization state.

One problem with the arrangement shown in FIG. 1 is that the two beams 150 and 160 propagate over different optical path lengths because of the walk-off crystal 120 and the half-wave plate 130. This can be a problem if the incoming astigmatic beam has a small waist. For instance, if the beam waist is about 3.5 microns its Raleigh length or range is about 30 microns. The path length differential experienced by the two beams is generally desired to be less than this distance.

By way of illustration, in the example of FIG. 1 the walked-off beam 150 may travel an effective propagation distance of about 200 microns compared to the pass-through beam 160. Likewise, when traversing the half-wave plate 130 the walked-of beam 150 may travel an effective propagation distance of about −30 microns compared to the pass-through beam 160. Thus, the difference in the total effective propagation distance traveled by the two beams is about 170 microns. Clearly, this distance is large in comparison to the Rayleigh range of the beam.

Figure 2:
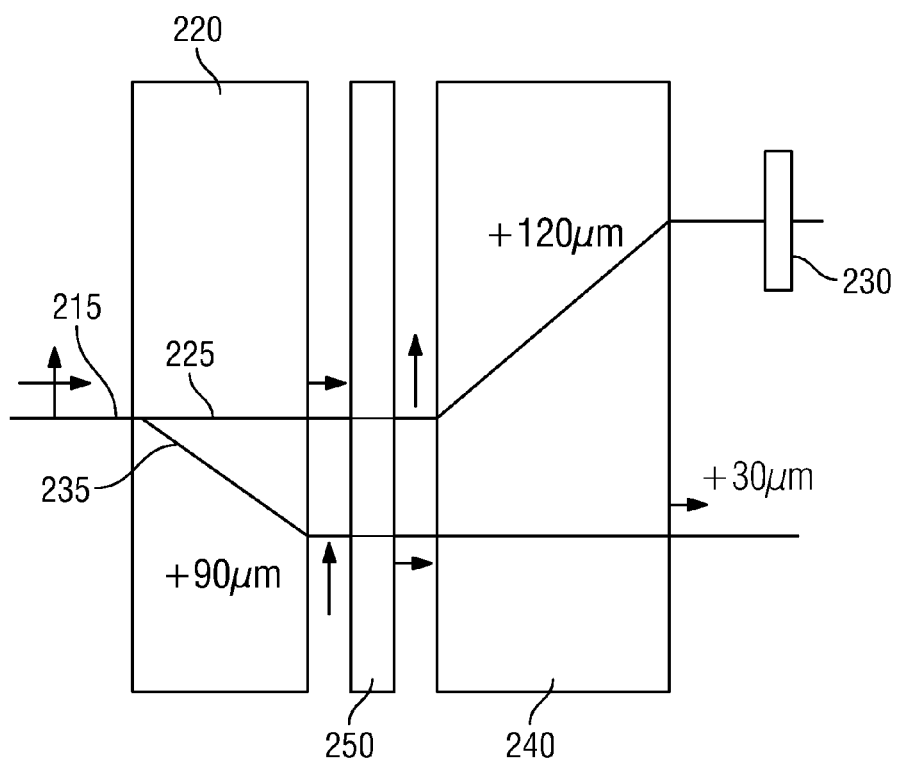
FIG. 2 shows one example of an optical path compensator.

One way to address this problem is to compensate for this difference in the total effective propagation distance by using two walk-off crystals that are oriented in opposite directions from one another. In this case a beam in one polarization state accumulates an effective propagation distance differential in the first walk-off crystal but not in the second walk-off crystal while the beam in the other polarization state accumulates an effective propagation distance differential in the second walk-off crystal but not the first walk-off crystal. FIG. 2 shows one example of an optical path compensator that is operable in this manner.

As shown in FIG. 2 the walked-off beam 235 undergoes an effective propagation distance differential of 90 microns in the first walk-off crystal 220 relative to the pass-though beam 225. A half-wave plate 250 rotates the polarization state of the beam 225 from the horizontal to the vertical so that it will be walked-off by the second walk-off crystal 240. Likewise, the half-wave plate 250 rotates the polarization state of the beam 235 from the vertical to the horizontal. As a consequence, the beam 225 undergoes an effective propagation distance differential of 120 microns in the second walk-off crystal 240 relative to the beam 235. Additionally, the beam 235 undergoes an additional effective propagation distance differential of 30 microns relative to the beam 225 since the beam 225 traverses the half-wave plate 230. Accordingly, the beam 225 undergoes a total effective propagation distance differential of 120 microns and the beam 235 also undergoes a total effective propagation distance differential of 120 microns (i.e., 90+30 microns). As a result both beams propagate over the same path length.

As the example of the optical path compensator shown in FIG. 2 illustrates, the thickness of the second walk-off crystal 240 is chosen to compensate for the effective propagation distance differential of both the first walk-off crystal 220 and the half-wave plate 230 through which only one of the beams pass. The thicknesses of the two walk-off crystals 220 and 240, which determine the additional path lengths traversed by the walked-off beams that respectively pass therethrough, are therefore different from one another.

FIG. 2 shows a single optical input port of an optical arrangement. The optical beams received by devices employing multiple ports may be processed in a similar manner to ensure that the two orthogonally polarized, spatially separated beams into which each incoming beam is divided propagate over the same path length. In some cases these optical arrangements incorporate the functionality of multiple wavelength switches may share a common set of optical elements such as lenses, dispersion elements and a spatial light modulator. One example of such a wavelength selective switch that employs the methods and techniques herein will be presented below in connection with FIGS. 3A and 3B.

Figure 3A:
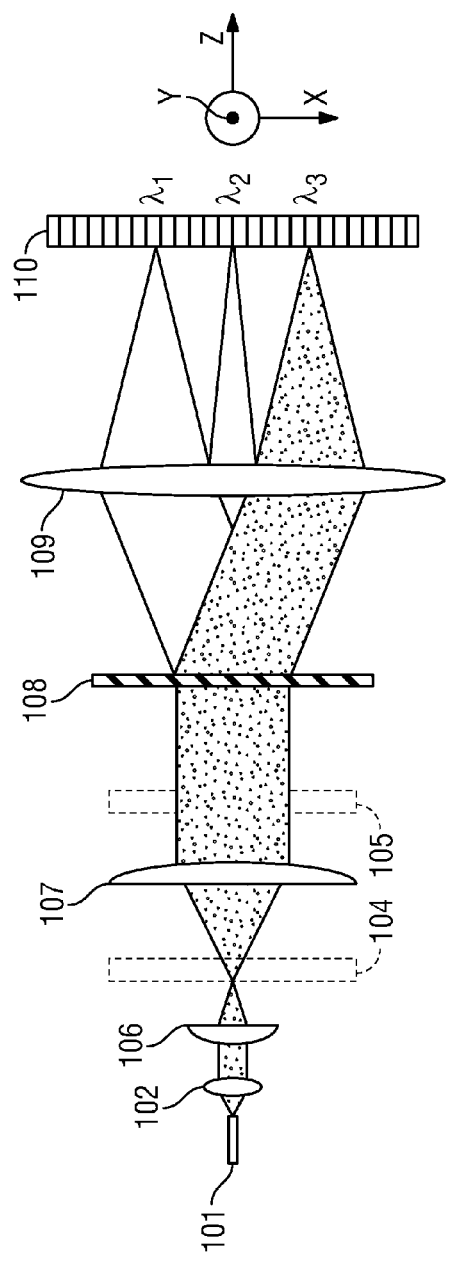
FIGS. 3A and 3B are top and side views respectively of one example of a simplified optical arrangement such as a free-space that may employ the optical path compensator shown in FIG. 2.
Figure 3B:
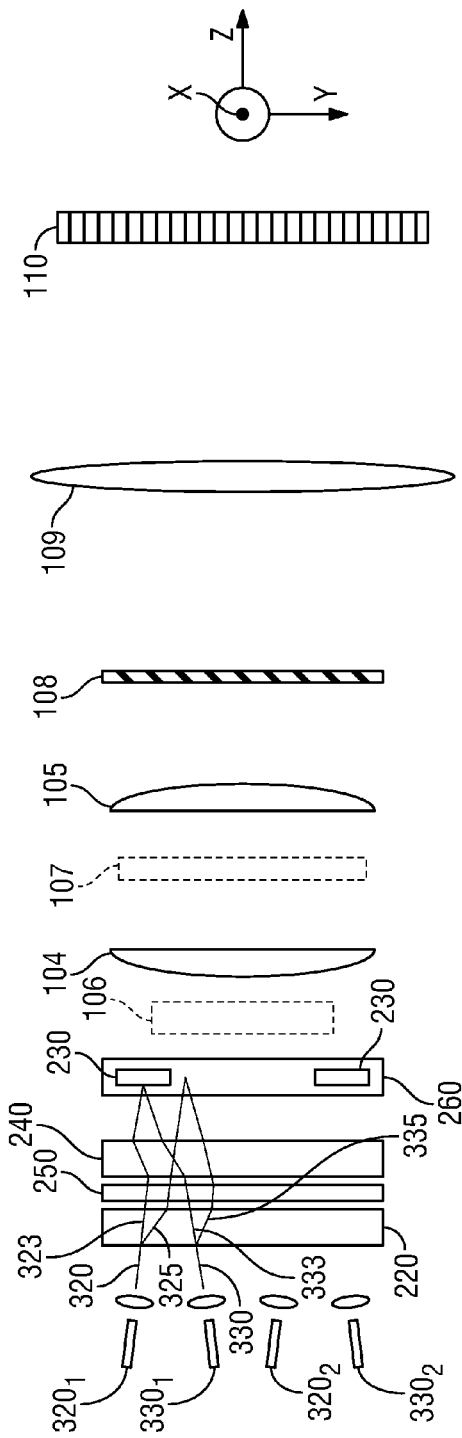

FIGS. 3A and 3B are top and side views respectively of one example of a simplified optical arrangement such as a free-space WSS 100 that may be used in conjunction with embodiments of the present invention. Light is input and output to the WSS 100 through optical waveguides such as optical fibers which serve as input and output ports. A fiber collimator array 101 includes a first series of fibers 120, which are associated with a first WSS, and a second series of fibers 130, which are associated with a second WSS. Each individual fiber is associated with a collimator 102, which converts the light from each fiber to a free-space beam.

As best seen in FIG. 3B, the fibers $320_1$, $320_2$, $320_3$ and $320_4$ in the first fiber series 320 are interleaved with the fibers $330_1$, $330_2$ and $330_3$ in the second fiber series 330. Moreover, as also seen in FIG. 3B, the fibers in the fiber series 320 are angularly offset from fibers in the second fiber series 330. This angular offset causes the wavelengths associated with the two different WSSs to be spatially offset from one another on the LCoS device 21 in the y-direction (the port axis), as shown in FIG. 2.

An optical path compensator of the type shown in FIG. 2 receives the optical beams from each fiber/collimator pair. In FIGS. 2 and 3 like elements are denoted by like reference numerals. Two representative beams are illustrated in FIG. 3B, a first beam that is received by fiber $320_1$ (associated with the first WSS) and a second beam that is received by adjacent fiber $330_1$ (associated with the second WSS). As shown, after exiting the first walk-off crystal 220 the optical beam received by fiber $320_1$ is divided into two beams 323 and 325 which are in orthogonal polarization states with respect to one another. Likewise, after exiting the second walk-off crystal 240 the optical beam received by fiber $330_1$ is divided into two beams 333 and 335 which are also in orthogonal polarization states with respect to one another.

The beams from the two different WSSs are angled so that they cross in the plane of the patterned half-wave plate 260 having half-wave plate segment 230. Accordingly, the location of the patterned half-wave plate determines the angle at which the beams need to be launched from the optical ports. In the example of FIG. 3B, the beam 323 from the port $320_1$ associated with the first WSS and the beam 333 from the port $130_1$ associated with the second WSS cross at the half-wave plate segment 230. Likewise, beam 325 from the port 3201 associated with the first WSS and the beam 335 from the port $330_1$ associated with the second WSS cross in the plane of the half-wave plate segment 230. In one alternative implementation, the beams 325 and 335 may be directed to the half-wave plate 230 and not the beams 323 and 333.

Following the optical path compensator, a pair of telescopes or optical beam expanders magnifies the free space light beams from the port array 101. A first telescope or beam expander is formed from optical elements 106 and 107 and a second telescope or beam expander is formed from optical elements 104 and 105.

In FIGS. 3A and 3B, optical elements which affect the light in two axes are illustrated with solid lines as bi-convex optics in both views. On the other hand, optical elements which only affect the light in one axis are illustrated with solid lines as plano-convex lenses in the axis that is affected. The optical elements which only affect light in one axis are also illustrated by dashed lines in the axis which they do not affect. For instance, in FIGS. 3A and 3B the optical elements 102, 108, 109 and 110 are depicted with solid lines in both figures. On the other hand, optical elements 106 and 107 are depicted with solid lines in FIG. 3A (since they have focusing power along the y-axis) and with dashed lines in FIG. 3B (since they leave the beams unaffected along the x-axis). Optical elements 104 and 105 are depicted with solid lines in FIG. 3B (since they have focusing power along the x-axis) and with dashed lines in FIG. 3A (since they leave the beams unaffected in the y-axis).

Each telescope may be created with different magnification factors for the x and y directions. For instance, the magnification of the telescope formed from optical elements 104 and 105, which magnifies the light in the x-direction, may be less than the magnification of the telescope formed from optical elements 106 and 107, which magnifies the light in the y-direction.

The pair of telescopes magnifies the light beams from the port array 101 and optically couples them to a wavelength dispersion element 108 (e.g., a diffraction grating or prism), which separates the free space light beams into their constituent wavelengths or channels. The wavelength dispersion element 108 acts to disperse light in different directions on an x-y plane according to its wavelength. The light from the dispersion element is directed to beam focusing optics 109.

Beam focusing optics 109 couple the wavelength components from the wavelength dispersion element 108 to a programmable optical phase modulator, which may be, for example, a liquid crystal-based phase modulator such as a LCoS device 110. The programmable optical phase modulator produces a phase shift at each of its pixels which gives rise to a phase shift profile across its surface. As shown in FIG. 3, the wavelength components are dispersed along the x-axis. Accordingly, each wavelength component of a given wavelength is focused on an array of pixels 19 extending in the y-direction. By way of example, and not by way of limitation, three such wavelength components having center wavelengths denoted $X_1$, $X_2$ and $X_3$ are shown in FIG. 3A being focused on the LCoS device 110 along the wavelength dispersion axis (x-axis).

As best seen in FIG. 3B, after reflection from the LCoS device 110, each wavelength component can be coupled back through the beam focusing optics 109, wavelength dispersion element 108 and optical elements 106 and 107 to a selected fiber in the port array 101. Accordingly, appropriate manipulation of the pixels 19 in the y-axis allows selective independent steering of each wavelength component to a selected output fiber.

Although the subject matter has been described in language specific to structural features and/or methodological acts, it is to be understood that the subject matter defined in the appended claims is not necessarily limited to the specific features or acts described above.

The invention claimed is:

1. A method for compensating for a difference in optical path length traversed by first and second optical portions of an optical beam which are in orthogonal polarization states, comprising:

receiving the optical beam at the input port;

directing the optical beam to a first walk-off crystal for spatially separating the optical beam into first and second optical portions that are in first and second polarization states, respectively, the first and second polarization states being orthogonal to one another, the first optical portion being walked-off by the walk-off crystal and the second optical portion passing therethrough without being walked-off;

rotating the polarization state of the first and second optical portions;

after rotating the polarization state of the first and second optical portions, directing the first and second optical portions to a second walk-off crystal being oriented in an opposite direction from the first walk-off crystal so that the second optical component is walked-off by the walk-off crystal and the first optical component passes therethrough without being walked-off, a thickness of the first and second walk-off crystals being selected to adjust the optical path lengths traversed by each of the first and second optical portions.

2. The method of claim 1 wherein the thickness of the first and second walk-off crystals is further selected to compensate for an optical path difference that arises from one or more upstream or downstream optical elements that is traversed by one of the first and second optical portions and not the other of the first and second optical portions.

3. The method of claim 1 wherein the optical element is a half-wave plate located downstream from the first and second walk-off crystals.

4. The method of claim 1 wherein the first input port is angularly offset with respect to the second input about an axis parallel to the wavelength dispersion axis.

5. A method for directing wavelength components of an optical beam from an input port of a port array to at least one output port of the port array, comprising:

receiving a first optical beam at a first input port of the port array associated with a first wavelength selective switch;

receiving a second optical beam at a second input port of the port array associated with a second wavelength selective switch;

directing the first optical beam to a first walk-off crystal for spatially separating the first optical beam into first and second optical portions that are in first and second polarization states, respectively, the first and second polarization states being orthogonal to one another, the first optical portion being walked-off by the walk-off crystal and the second optical portion passing therethrough without being walked-off;

directing the second optical beam to the first walk-off crystal for spatially separating the second optical beam into third and fourth optical portions that are in the first and second polarization states, respectively, the third optical portion being walked-off by the first walk-off crystal and the fourth optical portion passing therethrough without being walked-off;

rotating the polarization state of the first, second, third and fourth optical portions;

after rotating the polarization state of the first, second, third and fourth optical portions, directing the first, second, third and fourth optical portions to a second walk-off crystal being oriented in an opposite direction from the first walk-off crystal so that the second and fourth optical portions are walked-off by the second walk-off crystal and the first and third optical components pass therethrough without being walked-off, a thickness of the walk-off crystals being selected to adjust the optical path lengths traversed by each of the first, second, third and fourth optical portions;

spatially separating the wavelength components of the first, second, third and fourth optical portions;

focusing the spatially separated wavelength components onto a programmable optical phase modulator so that the wavelength components of the first and second optical beams are spatially separated along a wavelength dispersion axis of the modulator; and adjusting a phase shift profile of the modulator along the second direction to selectively direct individual ones of the wavelength components to an output port.

6. The method of claim 5 wherein the thickness of the first and second walk-off crystals is further selected to compensate for an optical path difference that arises from one or more upstream or downstream optical elements that is traversed by one of the first and second optical portions and not the other of the first and second optical portions and that is traversed by one of the third and fourth optical portions and not the other of the third and fourth optical portions.

7. The method of claim 5 wherein the optical element is a half-wave plate located downstream from the first and second walk-off crystals.

8. The method of claim 5 wherein the first input port is angularly offset with respect to the second input about an axis parallel to the wavelength dispersion axis.

9. An optical device, comprising:

an optical port array having a first plurality of ports for receiving optical beams and a second plurality of ports for receiving optical beams;

a first walk-off crystal for spatially separating each of the optical beams into first and second optical portions that are in first and second polarization states, respectively, the first and second polarization states being orthogonal to one another, the first optical portions being walked-off by the first walk-off crystal and the second optical portions passing therethrough without being walked-off;

a first half-wave plate for rotating the polarization state of the first and second optical portions of the optical beams;

a second walk-off crystal being oriented in an opposite direction from the first walk-off crystal such that the second optical portions are walked-off by the second walk-off crystal and the first portions pass therethrough without being walked-off; and a segmented half-wave plate for receiving the second optical portions of the optical beams or the first optical portions of the optical beams.

10. The optical device of claim 9 wherein a thickness of the first and second walk-off crystals being selected to adjust the optical path lengths traversed by each of the first and second optical portions to compensate for an optical path difference that arises from the first optical portions or the second optical portions traversing the segmented half-wave plate and the other of the first and second optical portions not traversing the segmented half-wave plate.

11. The optical device of claim 9 further comprising:

a dispersion element receiving the first and second optical portions of the optical beams and spatially separating the first and second optical portions into a plurality of wavelength components along a wavelength dispersion axis, a port axis being orthogonal to the wavelength dispersion axis, the first plurality of ports extending in a first plane that includes the port axis and the second plurality of ports extending in a second plane that includes the port axis, the first and second planes being parallel to one another and offset from one another along the wavelength dispersion axis, the first plurality of ports being angularly offset with respect to the second plurality of ports about an axis parallel to the wavelength dispersion axis;

a focusing element for focusing the plurality of wavelength components; and a programmable optical phase modulator for receiving the focused plurality of wavelength components, the modulator being configured to steer the wavelength components received from any one of the first plurality of ports to a selected one of the first plurality of ports and being further configured to steer the wavelength components received from any one of the second plurality of ports to a selected one of the second plurality of ports.

12. The optical device of claim 9 wherein the first plurality of ports are interleaved with the second plurality of ports along the port axis.

13. The optical device of claim 9 wherein the programmable optical phase modulator includes a liquid crystal-based phase modulator.

14. The optical device of claim 13 wherein the liquid crystal-based phase modulator is a LCoS device.

15. The optical device of claim 11 wherein the dispersive element is selected from the group consisting of a diffraction grating and a prism.

16. The optical device of claim 11 further comprising an optical system for magnifying the optical beam received from the optical port array and directing the magnified optical beam to the dispersion element.

17. The optical device of claim 16 wherein the optical system has a first magnification factor in a first direction and a second magnification factor in a second direction orthogonal to the first direction, the first magnification factor being different from the second magnification factor.

18. The optical device of claim 17 wherein the first direction is parallel to a wavelength dispersion axis along which the optical beams are spatially separated, the first magnification factor being less than the second magnification factor.

* * * * *